G. A. LAMBERT.
FRICTION GEARING.
APPLICATION FILED FEB. 26, 1914.
1,125,132. Patented Jan. 19, 1915.
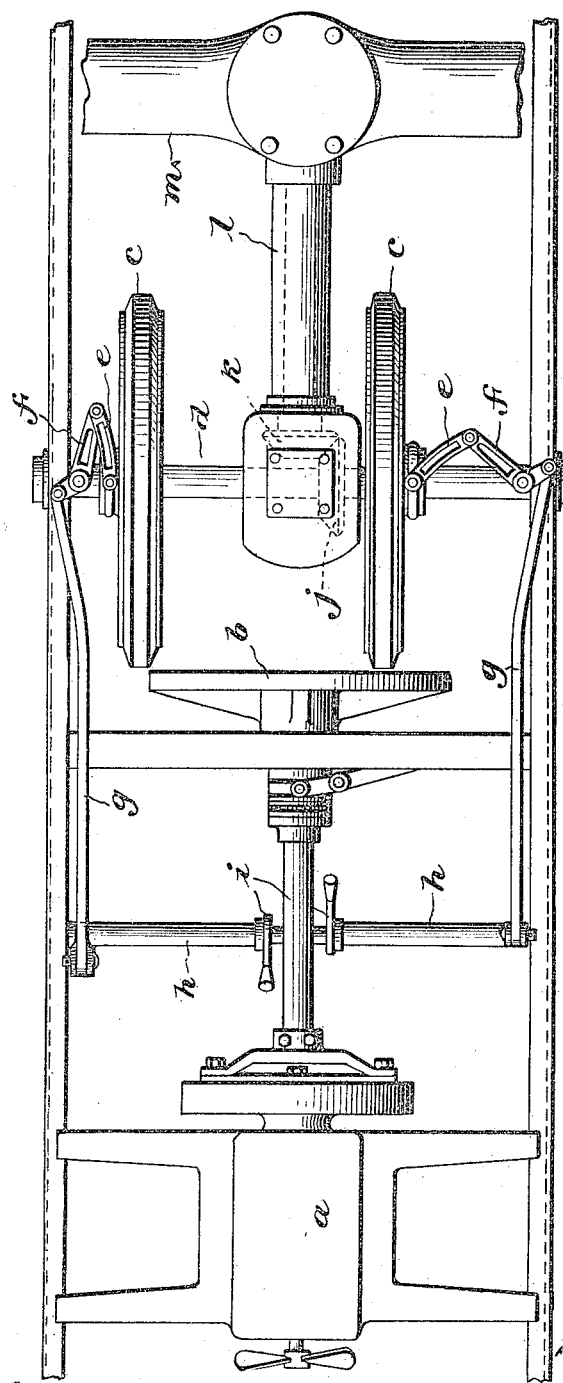

UNITED STATES PATENT OFFICE.

GEORGE A. LAMBERT, OF ANDERSON, INDIANA.

FRICTION-GEARING.

1,125,132.          Specification of Letters Patent.      Patented Jan. 19, 1915.

Application filed February 26, 1914. Serial No. 821,182.

*To all whom it may concern:*

Be it known that I, GEORGE A. LAMBERT, a citizen of the United States of America, and a resident of Anderson, county of Madison, State of Indiana, have invented certain new and useful Improvements in Friction-Gearing, of which the following is a full and clear specification, in which is represented a plan view showing my gearing applied to a rear-axle shaft-drive motor-vehicle.

The object of this invention is to adapt the friction type of gearing to the well known rear-axle shaft-drive motor vehicle, means being provided whereby the driven axle may be reversed at will, thereby adapting this type of gearing to motor vehicles in such manner as to avoid the need for driving chains, as more fully hereinafter set forth.

In the drawings, $a$ designates an internal combustion motor; $b$, a friction disk driven by the motor and adapted to be bodily shifted axially to bring it into and out of contact with two driven friction wheels $c$.

The friction wheels $c$ are mounted to rotate with and to slide upon a shaft $d$ journaled in the chassis and lying parallel to the face of the disk $b$ and in the same plane as the center of said disk. The wheels $c$ are adapted to be moved along their shaft to bring them nearer to or farther from the center of the driving disk $b$ to thereby decrease or increase the speed of the driven shaft. I may employ any suitable means for thus independently shifting these friction wheels, but this means must be capable of shifting either wheel outwardly far enough to entirely avoid contact with the friction face of the driving disk.

For shifting the disk I have shown a fork $e$, a bell crank $f$, a push-and-pull rod $g$, a rock shaft $h$ connected to said rod $g$ and provided with a hand-lever $i$, which latter will be located within convenient reach of the chauffeur so that, by means of the lever $i$, he may readily throw the connected friction wheel outwardly far enough to entirely avoid contact with the driving disk $b$ when the same is shifted rearwardly into operative position. In this manner, either one of the wheels $c$ may be shifted into position for contact with the driving disk when the same is shifted rearwardly to operative position and may be moved inwardly and outwardly upon the face of the driving disk for the purpose of decreasing or increasing the speed.

At a point between the two friction wheels $c$, the driven shaft $d$ is geared (by means of a pair of bevel gears $j$ and $k$, or otherwise) to the propeller shaft $l$ which extends rearwardly and is geared in the usual manner to the standard rear-axle structure, the casing of which is shown at $m$. With this construction it will be seen that the propeller shaft may be driven at any suitable speed within the limits of the apparatus and in either direction; further, that the power is taken off at the most advantageous point, namely, at a point about midlength of the driven shaft $d$ and between the driven friction wheels $c$.

Having thus described my invention, what I claim is:

In combination, a driving disk, a driven shaft parallel with the face thereof, a pair of driven friction wheels rotatable with but slidable upon said driven shaft, means for shifting each of these friction wheels independently far enough to vary the speed and also to carry it to inoperative position with respect to the friction face of the driving disk, means for relatively bodily moving the driving disk and the friction wheels to bring the driving disk into operative relation with either of the friction wheels, and a propeller shaft and gears connecting the same to the driven shaft at a point between the friction wheels, for the purpose set forth.

In testimony whereof I hereunto affix my signature in the presence of two witnesses.

GEORGE A. LAMBERT.

Witnesses:
G. M. KURTZ,
ALVIN HERSBERGER.

Copies of this patent may be obtained for five cents each, by addressing the "Commissioner of Patents, Washington, D. C."